United States Patent
Wagenhuber

[11] Patent Number: 6,025,845
[45] Date of Patent: Feb. 15, 2000

[54] METHOD FOR IMAGING A TECHNICAL SYSTEM WITH A COMPUTER

[75] Inventor: Josef Wagenhuber, Gerolsbach, Germany

[73] Assignee: Siemens Aktiengesellschaft, Munich, Germany

[21] Appl. No.: 09/031,971

[22] Filed: Feb. 27, 1998

[30] Foreign Application Priority Data

Mar. 19, 1997 [DE] Germany .......................... 197 11 484

[51] Int. Cl.$^7$ .................................................. G06F 15/00
[52] U.S. Cl. ............................................................ 345/418
[58] Field of Search ..................... 345/418, 419, 345/433, 440, 441

[56] References Cited

U.S. PATENT DOCUMENTS 5,675,720  10/1997  Sato et al. ................................ 345/420
5,687,259  11/1997  Linford .................................... 382/294

OTHER PUBLICATIONS

"Optimization and Sensitivity Analysis for Multiresponse Parameter Estimation in Systems of Ordinary Differential Equations," Guay et al., Computers chem Engng. vol. 19, No. 12 (1995) pp. 1271–1285.

"Optimal Determination of Rate Coefficients in Multiple–Reaction Systems," Weber et al., Computers chem., vol. 16, No. 4 (1992) pp. 325–333.

Parameters Estimation of an Aquatic Biological System by the Adjoint Method, Marcos et al., Mathematics and Computers in Simulation 30 (1988) pp. 405–418.

"Dynamische Optimierung großer chemischer Prozesse mit Kollokations–verfahren am Beispiel Batch–Destillation," Li et al., Automatisierungstechnik 45 (1997) pp. 136–143.

*Primary Examiner*—Phu K. Nguyen
*Attorney, Agent, or Firm*—Hill & Simpson

[57] ABSTRACT

In a method that solves a modeling problem of an input/output system in a computer, weighting function, which indicates deviations of measured output values of the real system from the output values of the model, is optimized in the computer by minimizing gradients. This minimization is accomplished by first the derivative of the weighting parameters relative to the system parameters, and then minimizing the derivative of the weighting function relative to an initial state vector.

4 Claims, 1 Drawing Sheet

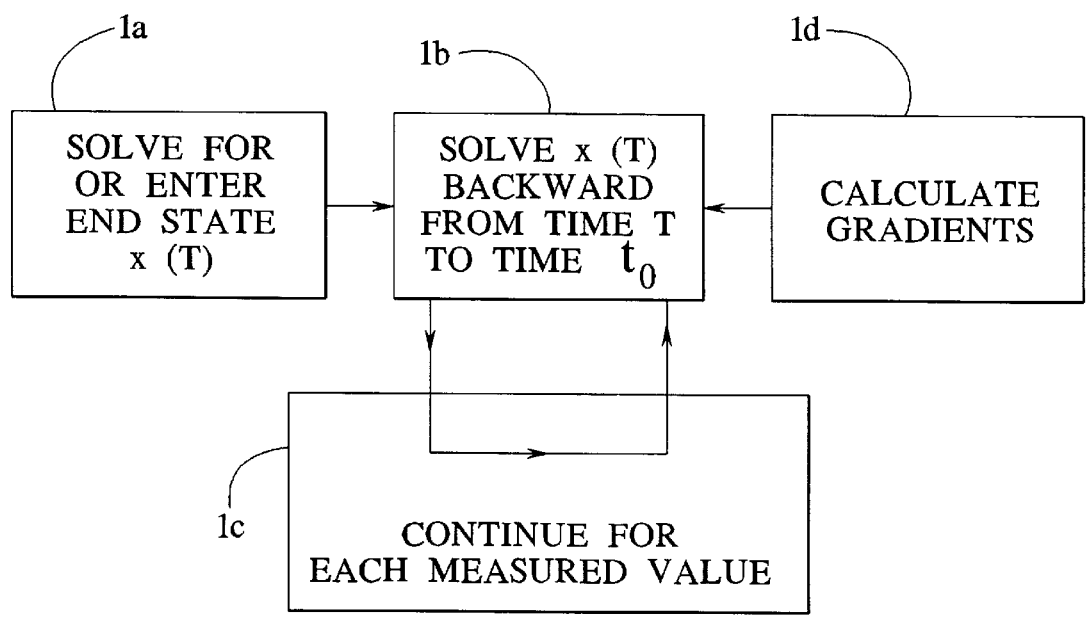

METHOD FOR IMAGING A TECHNICAL SYSTEM WITH A COMPUTER

BACKGROUND OF THE INVENTION

1. Field of the Invention

The present invention is directed to a method for imaging a technical system with a computer.

2. Description of the Prior Art

It is important that prescribable technical systems be described suitably exactly by a modeling. It is thus of great significance to suitably exactly model (image) a complex technical system, for example a chemical process that is dependent on a number of input quantities and a number of output quantities, so that any modeling error, i.e. a difference between the modeling and the underlying, real system, is minimized.

M. Guay, et al., "Optimization and Sensitivity Analysis for Multiresponse Parameter Estimation in Systems of Ordinary Differential Equations," Computers Chem. Engng., Vol. 19, No. 12, pp. 1271–1285, discloses that a differential equation system of the variation equations be solved on the basis of sensitivity matrices. This procedure exhibits the disadvantage that the calculation of entire sensitivity matrices requires much calculating time and that a method based thereon exhibits clear sacrifices in speed.

C. F. Weber et al., "Optimal Determination of Rate Coefficients in Multiple-Reaction Systems," Computers Chem., Vol. 16, No. 4, pp.325–333, 1992 and B. Marcos et al., "Parameter Estimation of an Aquatic Biological System by the Adjoint Method," Mathematics and Computers in Simulation 30 (1988), pp. 405–418, disclose methods employing Lagrange multipliers. The Lagrange multipliers are calculated as a solution to a type of equation known as adjunctive equations. Each measured point supplies its own contribution to the Lagrange multipliers; the adjunctive equations are thus to be solved per respective measured point. Such a method is extremely time-consuming and makes high demands of the memory requirements on the computer.

SUMMARY OF THE INVENTION

An object of the present inventive method is to minimize modeling error in the imaging of a real system.

The above object is achieved in accordance with the principles of the present invention in a method wherein a weighting function is optimized in a computer, the weighting function indicating deviations of measured output values of the real system from the output values of the model. The weighting function is minimized by first minimizing the derivative of the weighting parameters relative to the system parameters, and then minimizing the derivative of the weighting function relative to an initial state vector.

In general, the weighting function E is composed of the sum of all weighted deviations according to $$E = \sum_v e(y(t_v), n_v)$$

and an important exemplary form for the weighted deviation is established by a quadratic deviation $$e(y(t_v), n_v) = \frac{1}{2}(y(t_v) - n_v)^2$$

wherein v is a count variable, y are output values of the modeling, t is a time variable, and $n_v$ is a measured output value of the system.

Bold-face symbols in the following equations identify vectors.

The model error that arises in the imaging of a real system in a model is described by defining a weighting function. This weighting function represents the deviation of the output values measured in the real system from the output values resulting in the model. An optimization of the weighting function is undertaken by determining gradients in a computer that represent local derivatives of the weighting function at prescribable values of system parameters, and an initial state vector. The weighting function is minimized with the assistance of the gradient function and the system is represented in optimized form by the imaging model.

In one embodiment of the inventive method a quadratic deviation is employed as the weighting function.

In a further embodiment of the invention, a resolution of an interval under consideration into a number of sub-intervals, to which the inventive method is respectively separately applied is undertaken, and calculated sub-results are summed to form the overall result.

DESCRIPTION OF THE DRAWINGS

The single FIGURE shows a block diagram that contains steps of the inventive method.

DESCRIPTION OF THE PREFERRED EMBODIMENTS

The steps of the inventive method are shown in FIG. 1. The object of modeling a system (input/output system) having the following form is raised in many technical applications:

$$\frac{d}{dt}x(t) = f(x(t), u(t), w) \tag{1}$$

$$y(t) = m(x(t), w)$$

whereby a modeling problem is to define of the system parameter w. In the framework of system theory, Equation (1) is known as state space representation of a non-linear system. The internal state of the system is represented in the state vector x. A time development (progression) of the internal states is described by a dynamic system f (a system of differential equations). In addition to being influenced by the constant system parameters w, the time development is also be influenced by external quantities, input values u here, that are usually time-dependent. Output values y of the system that quantify the system behavior as seen externally of the system, are dependent in a prescribable way on the state vector x via a static imaging m. In the normal case, further, the static imaging m contains parameters that are likewise contained in the system parameters w.

As noted above, the modeling problem is to define of the system parameters w of the system, which is described by joining the dynamic system f with the static imaging m. Measured output values of the (real) system $n_v$ at prescribable points in time $t_v$ are known. These points in time $t_v$ are monotonously ordered and are located in an encompassing time interval $[t_0, T]$ within which the system behavior is investigated. The measured output values of the system $n_v$ that describe the time development of the output values of the modeling $y(t)$ in discrete form given a specific initial state vector $x_0$ are referred to as a measurement series.

Given the presence of a number of measurement series, all quantities considered below are individually determined for each measurement series and the results are summed. For simplicity and easier presentation, the existence of only one measurement series is assumed below.

If the system has input values $u(t)$, then these are likewise assumed to be predetermined in terms of their time curve.

The modeling problem is solved when a coincidence between the measured output values of the system $n_v$ and the appertaining output values of the modeling $y(t_v)$ is achieved by a corresponding selection of the system parameters w in the dynamic system f and of the static imaging m. The output values of the modeling $y(t_v)$ derive from the modeling of the (real) system according to Equation (1) with the calculated system parameters w in the time interval $[t_0,T]$ proceeding from the initial state vector $x_0$. Given an unknown initial state, the initial state vector $x_0$ is a further parameter of the model and is to be determined in the framework of the modeling in addition to the system parameters w.

The technical solution of the modeling problem is achieved by formulating an optimization task. To this end, the deviation between measured output value of the system $n_v$ and output values of the modeling $y(t_v)$ is quantified.

In practice, an important exemplary form for the weighted deviation is established by a quadratic deviation $$e(y(t_v), n_v) = \frac{1}{2}(y(t_v) - n_v)^2 \tag{2}$$

In general, the weighting function is composed of the sum of all weighted deviations according to $$E = \sum_v e(y(t_v), n_v) \tag{3}$$

that is also referred to as error square sum in the case of the quadratic deviation (see Equation (2)).

Since the weighting function E is dependent on the calculated output values of the modeling y in Equation (1), there is thus an indirect dependency between the weighting function E and the system parameters w and, potentially, on the initial state vector $x_0$. A minimization of the deviations between the measured output values of the (real) system $n_v$ and the calculated output values of the modeling $y(t_v)$ corresponds to an optimization of the weighting function E. The modeling problem is thus equivalent to an optimization of the weighting function E by corresponding variation of the system parameters w and of the initial state vector $x_0$. The optimization for determining the system parameters w is based on an evaluation of a gradient $$\frac{dE}{dw} \text{ (derivative relative to the system parameters)} \tag{g1}$$

and, given an unknown initial state vector $x_0$, is additionally based on an evaluation of a gradient $$\frac{dE}{dx_0} \text{ (derivative relative to the initial states)} \tag{g2}$$

The inventive method enables the efficient definition of the two above gradients (g1) and (g2), whereby only one integration of a system of differential equations arises per measurement series.

It should be noted that the interval $[t_0,T]$ can alternatively be resolved into a number of sub-intervals, whereby the inventive method is applied for each of these sub-intervals, and the quantities determined for each sub-interval are summed for the overall result.

The steps of the invention for determining the gradients are presented below.

In the step 1a, the dynamic system $$\frac{d}{dt}x(t) = f(x(t), u(t), w) \tag{4}$$

is solved forward from a point in time $t_0$ up to a point in time T using the initial state vector $x_0$, which is known, or is introduced as additional parameter. An end state $x(T)$ derives. If the end state $x(T)$ is known in some other way, step 1a is eliminated.

A system of differential equations $$\begin{cases} \frac{d}{dt}\frac{dE}{dw}(t) = -\left(\frac{\partial f(x(t), u(t), w)}{\partial w}\right)' \cdot \frac{dE}{dx_0}(t) \\ \frac{d}{dt}\frac{dE}{dx_0}(t) = -\left(\frac{\partial f(x(t), u(t), w)}{\partial x}\right)' \cdot \frac{dE}{dx_0}(t) \\ \frac{d}{dt}x(t) = f(x(t), u(t), w) \end{cases} \tag{5}$$

is solved in the step 1b backward from the point in time T to the point in time $t_0$, whereby ( )' references a transposed matrix. The solution method is stopped every time the measured value $n_v(t_0 \leq t_v \leq T)$ is reached (this also applies analogously for the special case $t_v = T$) and, following a discontinuous modification according to $$\frac{dE}{dx_0}(t_v) \mapsto \frac{dE}{dx_0}(t_v) + \left(\frac{\partial m}{\partial x}\bigg|_{x(t_v)}\right)' \cdot \frac{\partial e}{\partial y(t_v)} \tag{6}$$

the method in turn continues to the next measured value, until the start time $t_0$ is reached (step 1c).

Instead of Equation (6), the following modification rule applies for the special case of the error square sum cited in Equation(2).

$$\frac{dE}{dx_0}(t_v) \mapsto \frac{dE}{dx_0}(t_v) + \left(\left(\left(\frac{\partial m}{\partial x}\right)\bigg|_{x(t_v)}\right)\right)' \cdot (m(x(t_v), w) - n_v) \tag{6a}$$

The following are thereby employed as start values of a solution at the end point T of the interval $[t_0,T]$:

$$\frac{dE}{dw}(T) := 0, \quad \frac{dE}{dx_0}(T) := 0, \quad x(T) \tag{7}$$

In a step 1d, the gradients are calculated according to the following rule:

$$\frac{dE}{dw} = \frac{dE}{dw}(t_0) + \sum_v \left(\frac{\partial m}{\partial w}\bigg|_{x(t_v)}\right)' \cdot \frac{\partial e}{\partial y(t_v)} \tag{8}$$

$$\frac{dE}{dx_0} = \frac{dE}{dx_0}(t_0).$$

The following is then valid for the special case of the error square sum:

$$\frac{dE}{dw} = \frac{dE}{dw}(t_0) + \sum_{\nu}\left(\frac{\partial m}{\partial w}\bigg|_{x(t_\nu)}\right)' \cdot (m(x(t_\nu), w) - n_\nu) \quad (8a)$$

$$\frac{dE}{dx_0} = \frac{dE}{dx_0}(t_0).$$

An advantage of the invention compared to the known method of variation equations is a performance enhancement by a factor dim x.

A further advantage of the invention is that the integration with evaluation of the intermediate results is only required at the measured points, rather than in a grid that must be selected extremely fine for numerical integral calculation.

Further, the invention advantageously exhibits the property that the number of integrations of a differential equation system increases with the number of measurement series, but not with the number of measured points.

Finally, the inventive method is significantly more exact than a method of the finite differences.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for imaging a technical system in a computer, comprising the steps of:

a) defining a deviation of measured output values of a technical system and of output values of an imaging by a weighting function:

$$E = \sum_{\nu} e(y(t_\nu), n_\nu)$$

with $$\frac{d}{dt}x(t) = f(x(t), u(t), w)$$

and $$y(t) = m(x(t), w)$$

wherein
  t is a time variable,
  y are output values of the modeling,
  w are system parameters,
  x is a time-dependent state vector,
  f( ) is a time development of internal states of the imaging of the technical system,
  u are input values
  m( ) is a static imaging,
  E is a weighting function
  e is a weighted deviation,
  v is a count variable and
  $n_\nu$ is a measured output value of the system;

b) optimizing weighting function in a computer by determining gradients $$\frac{dE}{dw} \text{ and } \frac{dE}{dx_\eta},$$

the following steps, wherein an initial state vector at time $t_0$ by $x_0$:

(1) solving a differential equation system $$\frac{d}{dt}x(t) = f(x(t), u(t), w)$$

in the computer from $t=t_0$ through $t=T$ using the initial state vector $x_0$, and thereby deriving an end state x(T);

(2) solving a system of differential equations $$\begin{cases} \frac{d}{dt}\frac{dE}{dw}(t) = -\left(\frac{\partial f(x(t), u(t), w)}{\partial w}\right)' \cdot \frac{dE}{dx_0}(t) \\ \frac{d}{dt}\frac{dE}{dx_0}(t) = -\left(\frac{\partial f(x(t), u(t), w)}{\partial x}\right)' \cdot \frac{dE}{dx_0}(t) \\ \frac{d}{dt}x(t) = f(x(t), u(t), w) \end{cases}$$

in the computer, wherein ( )' is a transposed matrix, from T backward to $t_0$, with an interruption when the measured output value $n_\nu$ of the system is reached at time $t_\nu$ with $t_0 \leq t_\nu \leq T$ and, following a discontinuous modification according to $$\frac{dE}{dx_0}(t_\nu) \mapsto \frac{dE}{dx_0}(t_\nu) + \left(\frac{\partial m}{\partial x}\bigg|_{x(t_\nu)}\right)' \cdot \frac{\partial e}{\partial y(t_\nu)}$$

continuing to a next measured value of the system or until the start time $t_0$ is reached; and (3) representing the gradients, except for correction terms, by the results of step (2):

$$\frac{dE}{dw} = \frac{dE}{dw}(t_0) + \sum_{\nu}\left(\frac{\partial m}{\partial w}\bigg|_{x(t_\nu)}\right)' \cdot \frac{\partial e}{\partial y(t_\nu)}$$

$$\frac{dE}{dx_0} = \frac{dE}{dx_0}(t_0)$$

c) minimizing the gradients and thereby representing the system by the imaging.

2. A method according to claim 1, further comprising dividing a time interval from the point in time $t_0$ to the point in time T into a plurality of sub-intervals, and applying method steps a, b and c for each sub-interval, and summing individual results of the respective sub-intervals to form an overall result.

3. A method for imaging a technical system with a computer, comprising the steps of:

a) defining a deviation of measured output values of the technical system and of output values of the imaging by the following weighting function:

with $$\frac{d}{dt}x(t) = f(x(t), u(t), w)$$

and $$y(t) = m(x(t), w)$$

wherein
  t is a time variable,
  y are output values of the modeling,
  w are system parameters,
  x is a time-dependent state vector,
  f( ) is a time development of internal states of the imaging of the technical system, u are input values
m( ) is a static imaging,
E is a weighting function
e is a weighted deviation,
v is a count variable and
$n_v$ is a measured output value of the system;
c) optimizing weighting function in a computer by determining gradients $$\frac{dE}{dw} \text{ and } \frac{dE}{dx_\eta},$$

the following steps, wherein an initial state vector at time $t_0$ by $x_0$:
(1) solving a differential equation system $$\frac{d}{dt}x(t) = f(x(t), u(t), w)$$

in the computer from $t=t_0$ through $t=T$ using the initial state vector $x_0$, and thereby deriving an end state $x(T)$;
(2) solving a system of differential equations $$\begin{cases} \frac{d}{dt}\frac{d}{dw}(t) = -\left(\frac{\partial f(x(t), u(t), w)}{\partial w}\right)' \cdot \frac{dE}{dx_0}(t) \\ \frac{d}{dt}\frac{dE}{dx_0}(t) = -\left(\frac{\partial f(x(t), u(t), w)}{\partial x}\right)' \cdot \frac{dE}{dx_0}(t) \\ \frac{d}{dt}x(t) = f(x(t), u(t), w) \end{cases}$$

in the computer, wherein ( )' is a transposed matrix, from T backward to $t_0$, with an interruption when the measured output value $n_v$ of the system is reached at time $t_v$ with $t_0 \leq t_v \leq T$ and, following a discontinuous modification according to $$\frac{dE}{dx_0}(t_v) \mapsto \frac{dE}{dx_0}(t_v) + \left(\frac{\partial m}{\partial x}\bigg|_{x(t_v)}\right)' \cdot \frac{\partial e}{\partial y(t_v)}$$

continuing to a next measured value of the system or until the start time $t_0$ is reached; and (3) representing the gradients, except for correction terms, by the results of step (2):

$$\frac{dE}{dw} = \frac{dE}{dw}(t_0) + \sum_v \left(\frac{\partial m}{\partial w}\bigg|_{x(t_v)}\right)' \cdot \frac{\partial e}{\partial y(t_v)}$$

$$\frac{dE}{dx_0} = \frac{dE}{dx_0}(t_0)$$

c) minimizing the gradients and thereby representing the system by the imaging.

4. A method according to claim 3, further comprising dividing a time interval from the point in time to $t_0$ the point in time T into a plurality of sub-intervals, and applying method steps a, b and c for each sub-interval, and summing individual results of the respective sub-intervals to form an overall result.

* * * * *